United States Patent
Jen et al.

(10) Patent No.: US 8,929,101 B2
(45) Date of Patent: Jan. 6, 2015

(54) DC TO DC CONVERTING CIRCUIT

(71) Applicant: Chung-Shan Institute of Science and Technology, Longtan Township, Taoyuan (TW)

(72) Inventors: Kuo-Kuang Jen, Longtan Township (TW); Yu-Min Liao, Longtan Township (TW); Chen-Ho Huang, Longtan Township (TW); Chien-Min Kao, Longtan Township (TW); Gwo-Huei You, Longtan Township (TW)

( * ) Notice: Subject to any disclaimer, the term of this patent is extended or adjusted under 35 U.S.C. 154(b) by 133 days.

(21) Appl. No.: 13/716,350

(22) Filed: Dec. 17, 2012

(65) Prior Publication Data
US 2014/0169041 A1    Jun. 19, 2014

(51) Int. Cl.
*H02M 3/335* (2006.01)
*H02M 3/337* (2006.01)
*H02M 1/00* (2006.01)

(52) U.S. Cl.
CPC .......... *H02M 3/33507* (2013.01); *H02M 3/337* (2013.01); *H02M 2001/0058* (2013.01)
USPC .......................................................... 363/17

(58) Field of Classification Search
USPC ............... 363/15, 16, 17, 95, 98, 131, 132
See application file for complete search history.

(56) References Cited

U.S. PATENT DOCUMENTS

| | | | | |
|---|---|---|---|---|
| 5,351,179 A * | 9/1994 | Tsai et al. | | 363/53 |
| 6,046,576 A * | 4/2000 | Jiang | | 323/259 |
| 6,452,816 B2 * | 9/2002 | Kuranuki et al. | | 363/17 |
| 6,483,723 B2 * | 11/2002 | Kuranuki et al. | | 363/17 |
| 6,587,356 B2 * | 7/2003 | Zhu et al. | | 363/17 |
| 6,836,414 B1 * | 12/2004 | Batarseh et al. | | 363/17 |
| 6,876,556 B2 * | 4/2005 | Zhu et al. | | 363/17 |
| 6,888,728 B2 * | 5/2005 | Takagi et al. | | 363/17 |
| 7,911,810 B2 * | 3/2011 | Shimada et al. | | 363/17 |

* cited by examiner

*Primary Examiner* — Adolf Berhane (57) ABSTRACT

The invention provides a DC to DC converting circuit, comprising: a transforming unit with a primary winding and a secondary winding; a bridge rectifier unit coupled to an input voltage, having a first output terminal and a second output terminal coupled to both side of the primary winding respectively; a first switch coupled between the input voltage and the first output terminal; a second switch coupled between the first output terminal and a ground terminal; a third switch coupled between the input voltage and the second output terminal; and a fourth switch coupled between the second output terminal and the ground terminal; an output unit paralleled to the secondary winding; and a clamping unit coupled to the input voltage and paralleled to the bridge rectifier unit, having an auxiliary switch coupled to the input voltage; and a clamping capacitor coupled between the auxiliary switch and the ground terminal; wherein the auxiliary switch is turned on when operation statuses of the first switch and the fourth switch or the second switch and the third switch are changed.

4 Claims, 10 Drawing Sheets

* # DC TO DC CONVERTING CIRCUIT

FIELD OF THE INVENTION

This invention relates to a voltage converting circuit, and more particularly, to a DC to DC converting circuit for avoiding surge voltage and improving voltage converting efficiency.

BACKGROUND OF THE INVENTION

Fuel cell is a device without storing ability for converting chemical energy to electric power directly. When the loading is increased, output voltage of fuel cell is then decreased. Thus, a DC to DC converter is necessarily to dispose between the fuel cell and the loading for providing a stable voltage source to the loading and increasing the application fields. Traditional DC to DC converter is faced with limitation of low power converting efficiency and narrow operation range in design and manufacture. For achieving a holding time period in input voltage decreasing circumstance, operation cycle and other operation parameters should be tuned for achieving the requirement of the holding time period in low input voltage condition. On the other hand, the power converting efficiency will be sacrificed for gaining the input voltage for normal operation. The way aforementioned wastes electric power because it can not optimize the circuit design and select a normal input voltage range of resonating network parameters adaptively.

For example, when the DC to DC converter is practiced by a full-bridge or half-bridge construction, a LC resonating loop is used for assisting a semiconductor switch turning on without power loss or turning off. If the switching frequency is higher than the resonating frequency, the switching loss will be canceled when the switch is conducted in zero voltage condition. The primary disadvantages of which are that a larger frequency range is required for tuning output of a large load and the output can not be well tuned in zero load condition. Besides, the full-bridge converter causes the switch generating a surge voltage between drain electrode and source electrode due to inductance loss of the switching moment of the switch and imbalance of the switch characteristics. The surge voltage decreases the circuit stability and reliability.

It is desirable, therefore, to provide a circuit for avoiding surge voltage and switching loss for solving problems aforementioned.

SUMMARY OF THE INVENTION

One of objects of the present invention is to provide a DC to DC converting circuit for avoiding surge voltage and improving voltage converting efficiency.

To achieve the abovementioned object, the invention provides a DC to DC converting circuit, comprising: a transforming unit with a primary winding and a secondary winding; a bridge rectifier unit coupled to an input voltage, having a first output terminal and a second output terminal coupled to both side of the primary winding respectively; a first switch coupled between the input voltage and the first output terminal; a second switch coupled between the first output terminal and a ground terminal; a third switch coupled between the input voltage and the second output terminal; and a fourth switch coupled between the second output terminal and the ground terminal; an output unit paralleled to the secondary winding; and a clamping unit coupled to the input voltage and paralleled to the bridge rectifier unit, having an auxiliary switch coupled to the input voltage; and a clamping capacitor coupled between the auxiliary switch and the ground terminal; wherein the auxiliary switch is turned on when operation statuses of the first switch and the fourth switch or the second switch and the third switch are changed.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure. The details and technology of the present invention are described below with reference to the accompanying drawings:

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

The technical characteristic of clamping technology is to replace the Snubber diode by an active switch for operating in high frequency circumstance. Energy generated by surge voltage is fed back to input power source for reducing power loss of the voltage converter. The present invention is practiced by the clamping technology. For clarity of disclosure, and not by way of limitation, the detailed description of the invention is divided into the subsections that follow.

Figure 1:
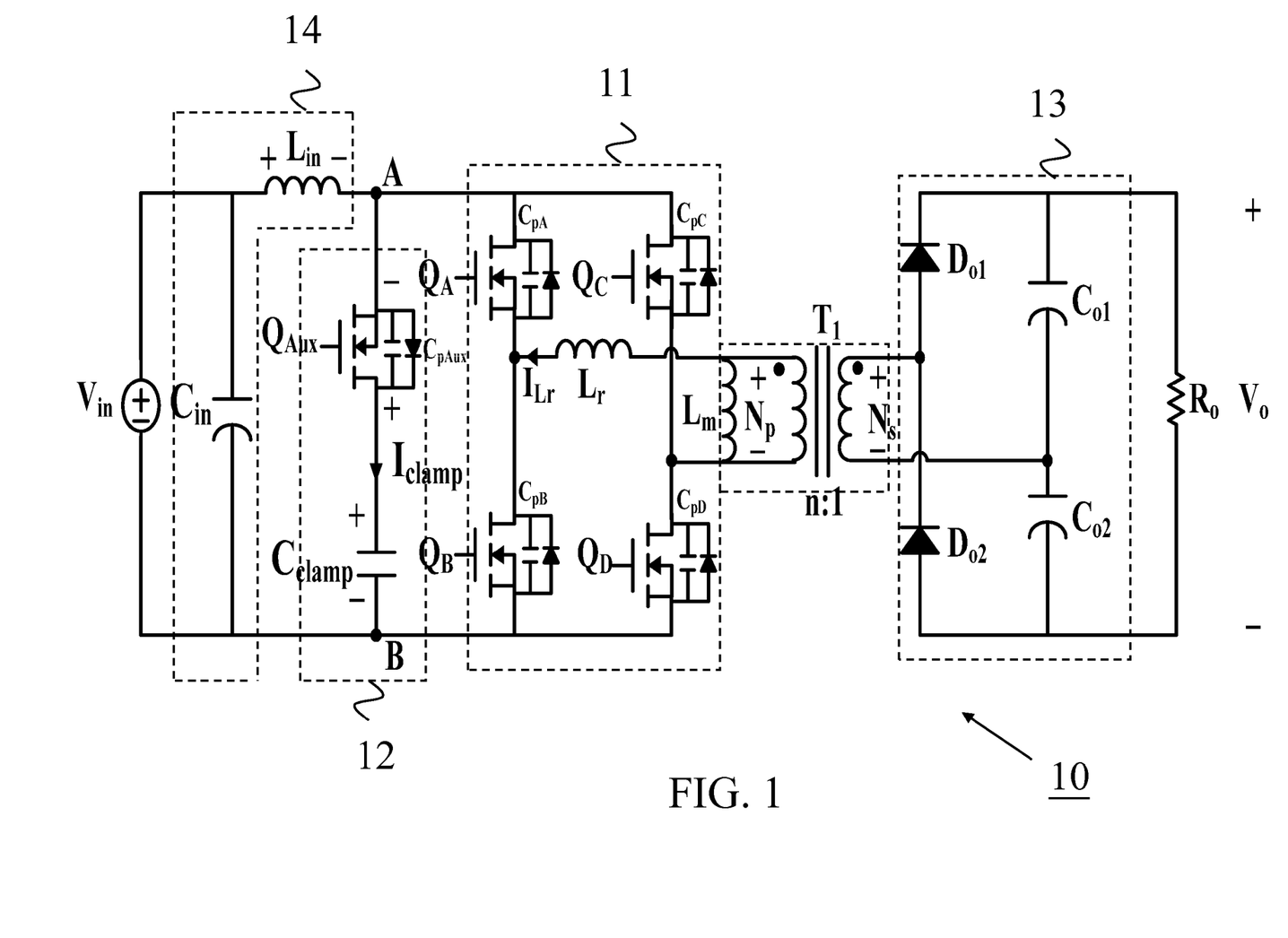
FIG. 1 is a circuit diagram of the DC to DC converting circuit of the present invention.

FIG. 1 is a circuit diagram of the DC to DC converting circuit of the present invention. As shown, the DC to DC converting circuit 10 is substantially composed of a transforming unit T1, a bridge rectifier unit 11, a clamping unit 12 and an output unit 13. The transforming unit T1 has a primary winding and a secondary winding. The bridge rectifier unit 11 is coupled to an input voltage $V_{in}$, having a first output terminal and a second output terminal coupled to both side of the primary winding respectively, a first switch $Q_A$, a second switch $Q_B$, a third switch $Q_C$ and a fourth switch $Q_D$. first switch $Q_A$ is coupled between the input voltage $V_{in}$ and the first output terminal. The second switch $Q_B$ is coupled between the first output terminal and a ground terminal. The third switch $Q_C$ is coupled between the input voltage $V_{in}$ and the second output terminal. The fourth switch $Q_D$ is coupled between the second output terminal and the ground terminal. The output unit 13 is paralleled to the secondary winding of the transforming unit T1. The clamping unit 12 is coupled to the input voltage $V_{in}$ and paralleled to the bridge rectifier unit 11. The clamping unit 12 has an auxiliary switch $Q_{AUX}$ and a clamping capacitor $C_{CLAMP}$. The auxiliary switch $Q_{AUX}$ is coupled to the input voltage $V_{in}$. The clamping capacitor $C_{CLAMP}$ is coupled between the auxiliary switch $Q_{AUX}$ and the ground terminal. The auxiliary switch $Q_{AUX}$ is turned on when operation statuses of the first switch $Q_A$ and the fourth switch $Q_D$ or the second switch $Q_B$ and the third switch $Q_C$ are changed. Thus, the surge voltage from the bridge rectifier unit 11 is avoided and the efficiency of the DC to DC converting circuit of the present invention is improved.

The output unit 13 is substantially composed of a first output diode $D_{o1}$, a second output diode $D_{o2}$, a first output capacitor $C_{o1}$ and a second output capacitor $C_{o2}$. The forward input end of the first output diode $D_{o1}$ is coupled to the first terminal of the secondary winding of the transforming unit T1 and the forward output end of the first output diode $D_{o1}$ is coupled to a load $R_o$. The voltage across the load $R_o$ is the output voltage $V_o$. The forward input end of the second output diode $D_{o2}$ is coupled to the ground terminal and the forward output end of the second output diode $D_{o2}$ is coupled to the first terminal of the secondary winding of the transforming unit T1. The first output capacitor $C_{o1}$ is coupled between the second terminal of the secondary winding of the transforming unit T1 and the load $R_o$. The second output capacitor $C_{o2}$ is coupled between the second terminal of the secondary winding of the transforming unit T1 and the ground terminal.

Besides, the DC to DC converting circuit further comprises an input unit 14 coupled between the clamping unit 12 and the input voltage $V_{in}$. The input unit 14 substantially composed of an input inductor $L_{in}$ and an input capacitor $C_{in}$. The input inductor $L_{in}$ is coupled between the clamping unit 12 (or the bridge rectifier unit 11) and the input voltage $V_{in}$. The input capacitor $C_{in}$ is paralleled to the input voltage $V_{in}$.

Before detail describing the principal that the voltage across the first switch $Q_A$ and the fourth switch $Q_D$ is clamped when the auxiliary switch $Q_{Aux}$ is turned on, we have to assume the following conditions:

(1) The impedance of the conducting lines is zero.
(2) Parasitic capacitance $C_{PAux}=C_{pA}=C_{pB}=C_{pC}=C_{pD}\ll C_{Cclamp}$.
(3) $L_{in}\gg L_r$
(4) The output capacitance is unlimited and the output voltage $V_o$ is a constant voltage.
(5) $E_{Lr}\gg E_{Cr}$: Energy storing in the resonating inductor is higher than that in resonating capacitor. The half resonating period of $L_r$ and $C_{clamp}$ is much more than the maximum off time of the power switches ($\pi\cdot\sqrt{L_r\times C_{clamp}}\gg[(1-D)T_s]_{max}$).

Figure 2:
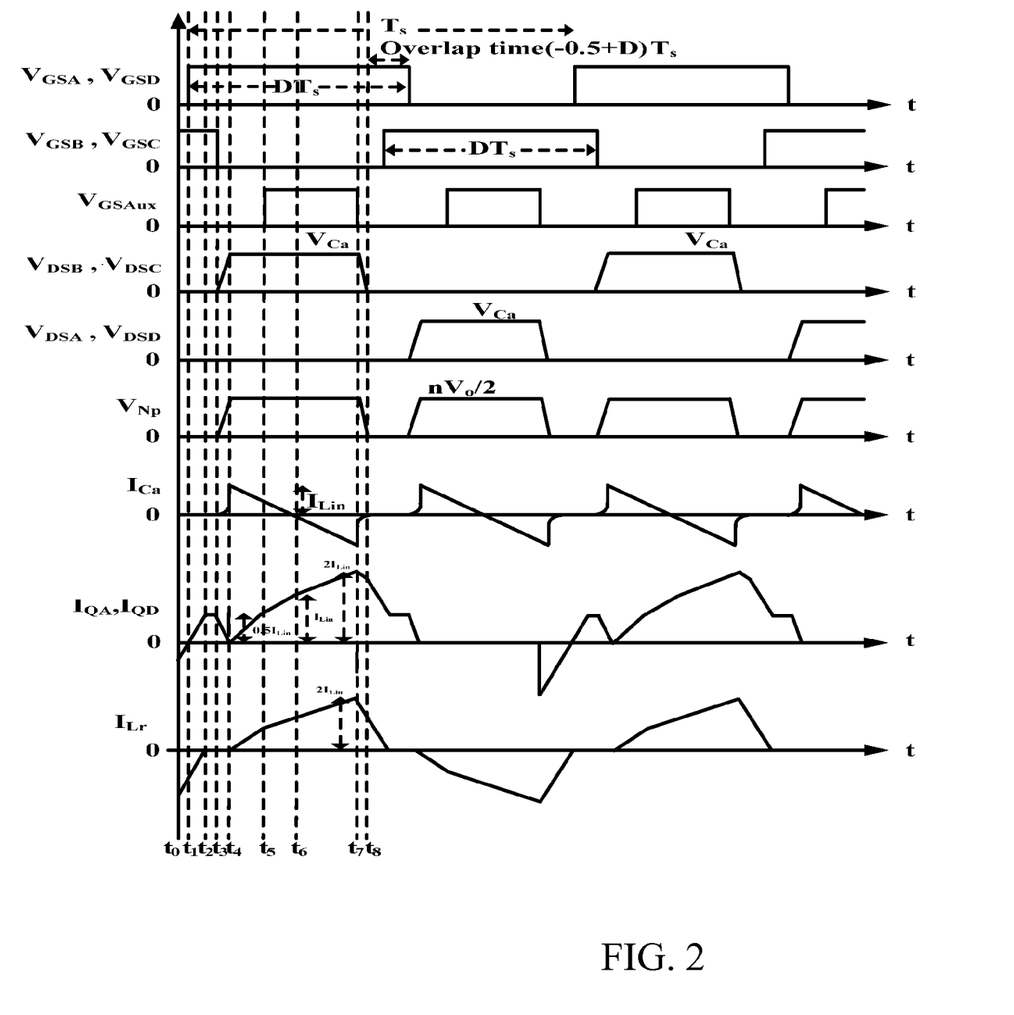
FIG. 2 is a control timing chart of the DC to DC converting circuit of the present invention.

FIG. 2 is a control timing chart of the DC to DC converting circuit of the present invention. As shown, the DC to DC converting circuit 10 has eight operation statuses. Different operation statuses of the DC to DC converting circuit 10 will be detail described with equivalent circuits and mathematic equations of resonating elements.

Figure 3A:
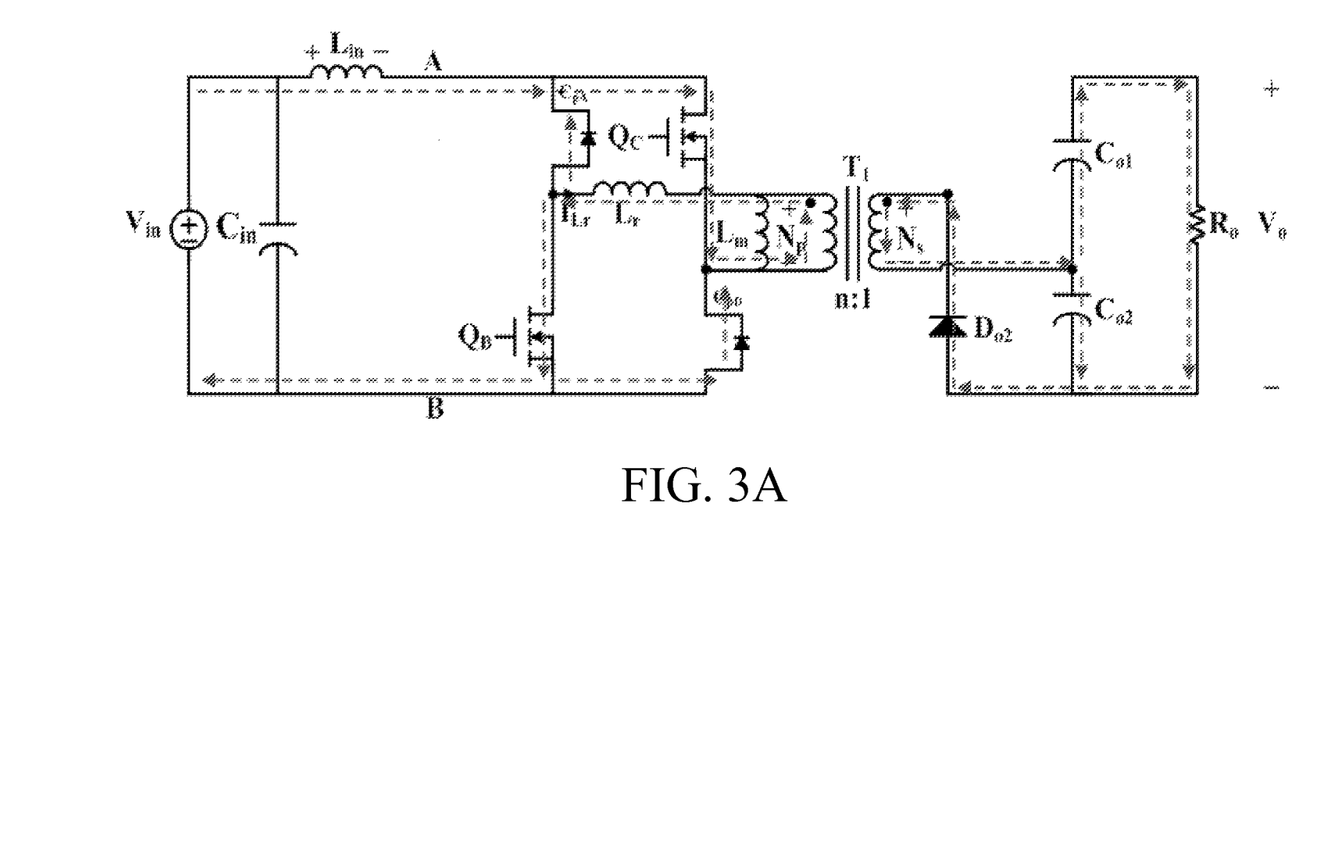
FIG. 3A to FIG. 3H are equivalent circuit diagrams of the DC to DC converting circuit corresponding to FIG. 2.

At the first status as the time being $t_0\sim t_1$, the energy transmission path is shown is FIG. 3A. The second switch $Q_B$ and the third switch $Q_C$ are turned on at $t_0$. Current $I_{Lr}$ of the leakage inductor $L_r$ releases energy to the transforming unit T1 and the second output diode $D_{o2}$ is tuned on for providing energy to the load $R_o$ and charging the first output capacitor $C_{o1}$ and the second output capacitor $C_{o2}$. At this status, voltage $V_{Cclamp}$ across the clamping capacitor $C_{clamp}$ equals to the voltage $V_{Ds,Aux}$ across the auxiliary switch $Q_{Aux}$. Thus, voltage $V_{AB}$ across the node A and node B is zero and current $I_{clamp}$ of the clamping capacitor $C_{clamp}$ is zero (no current flowing through the clamping capacitor $C_{clamp}$). After the parasitic capacitors $C_{pA}$, $C_{pD}$ of the first switch $Q_A$ and the fourth switch $Q_D$ have been discharged, the first switch $Q_A$ and the fourth switch $Q_D$ is then turned on for achieving zero voltage switching, and the status is terminated.

The following equations present the status description.

$$\frac{N_p}{N_s}=n, \tag{1}$$

$$V_{N_s}=\frac{V_o}{2}$$

$$v_{C_{clamp}}(t)=V_{C_{clamp}}=n\times\frac{V_o}{2} \tag{2}$$

$$i_{clamp}(t)=C_{clamp}\times\frac{dv_{C_{clamp}}(t)}{dt}=0 \tag{3}$$

$$L_{in}\frac{di_{L_{in}}(t)}{dt}=V_{L_{in}}(t) \tag{4}$$

Equations (5) and (6) are also gained in this status.

$$i_{L_{in}}(t)=\frac{V_{in}}{L_{in}}(t-t_0)+i_{L_{in}}(t_0) \tag{5}$$

$$i_{L_r}(t)=i_{L_r}(t_0)+\frac{nV_o}{2L_r}(t-t_0) \tag{6}$$

Figure 3B:
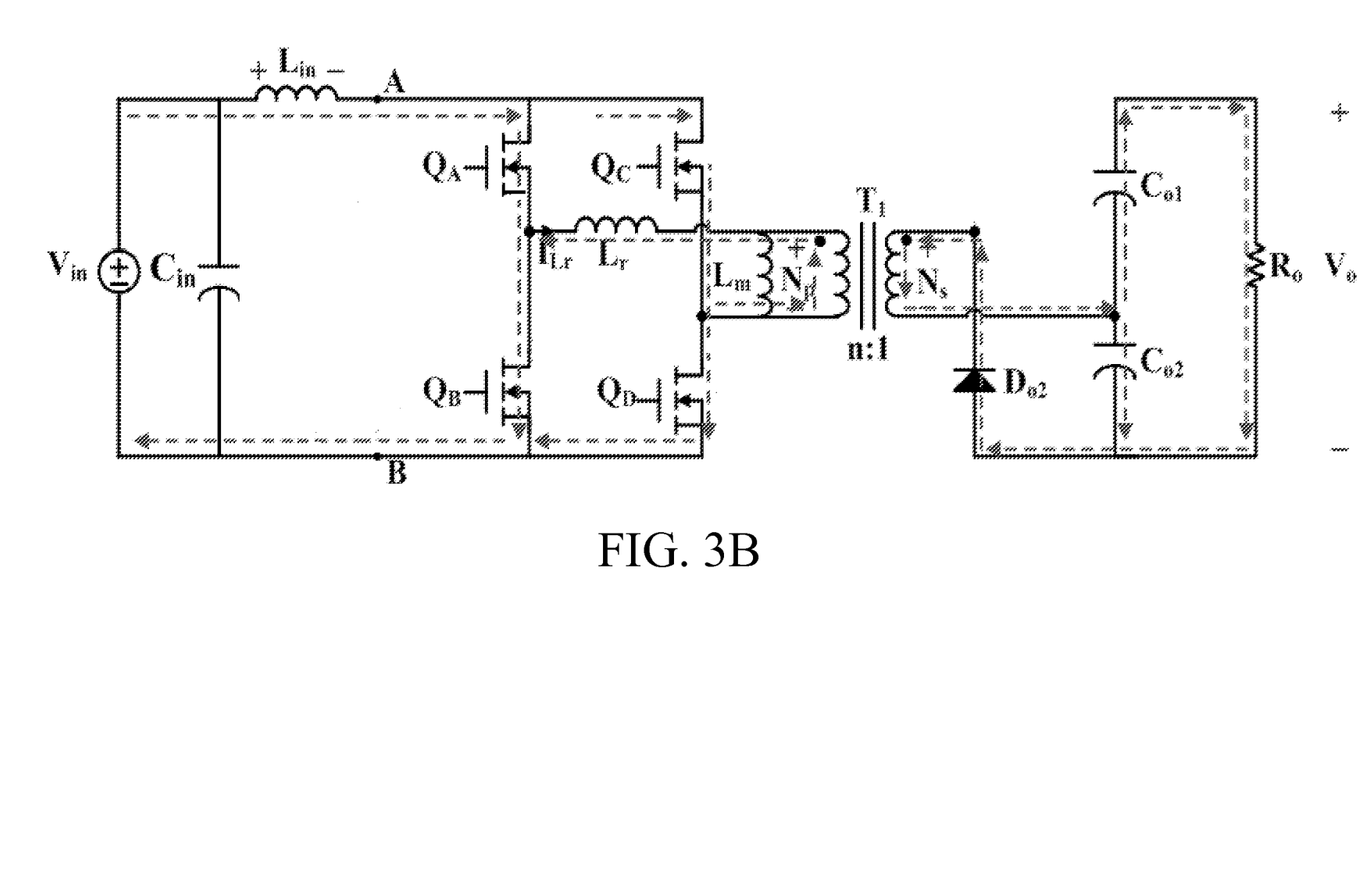

At the second status as the time being $t_1\sim t_2$, the energy transmission path is shown is FIG. 3B. The first switch to the fourth switch $Q_A$, $Q_B$, $Q_C$, $Q_D$ are all turned on at $t_1$. The input voltage $V_{in}$ charges the input inductor $L_{in}$ and the charging current is increased linearly. Current $I_{Lr}$ of the leakage inductor $L_r$ releases energy to the transforming unit T1 and the second output diode $D_{o2}$ is tuned on for providing energy to the load $R_o$ and charging the first output capacitor $C_{o1}$ and the second output capacitor $C_{o2}$. After the leakage inductor $L_r$ discharging to zero, the status is terminated.

The following equations present the status description.

$$i_{L_{in}}(t)=\frac{V_{in}}{L_{in}}(t-t_1)+i_{L_{in}}(t_1) \tag{7}$$

$$i_{L_r}(t)=i_{L_r}(t_1)+\frac{nV_o}{2L_r}(t-t_1) \tag{8}$$

Figure 3C:
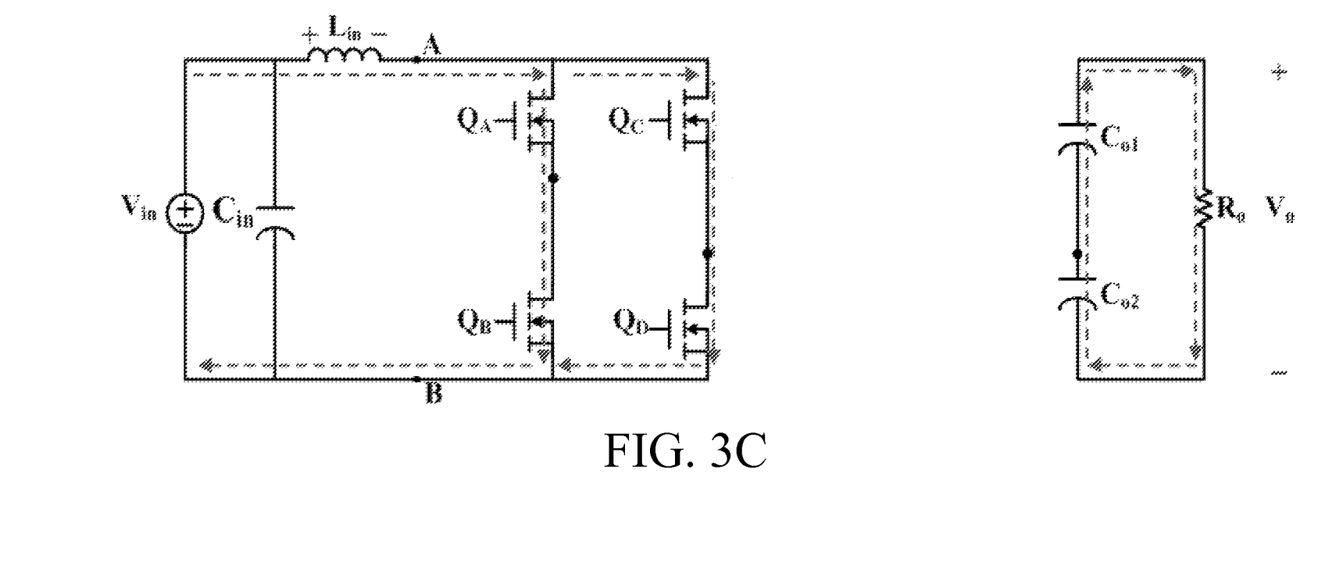

At the third status as the time being $t_2\sim t_3$, the energy transmission path is shown is FIG. 3C. The first switch to the fourth switch $Q_A$, $Q_B$, $Q_C$, $Q_D$ are all turned on at $t_2$. The input voltage $V_{in}$ charges the input inductor $L_{in}$ and the first output diode $D_{o1}$ and the second output diode $D_{o2}$ are turned off. The first output capacitor $C_{o1}$ and the second output capacitor $C_{o2}$ provide energy to the load $R_o$.

The following equations present the status description.

$$i_{L_r}(t)=0 \tag{9}$$

$$i_{L_{in}}(t)=\frac{V_{in}}{L_{in}}(t-t_3)+i_{L_{in}}(t_2) \tag{10}$$

Figure 3D:
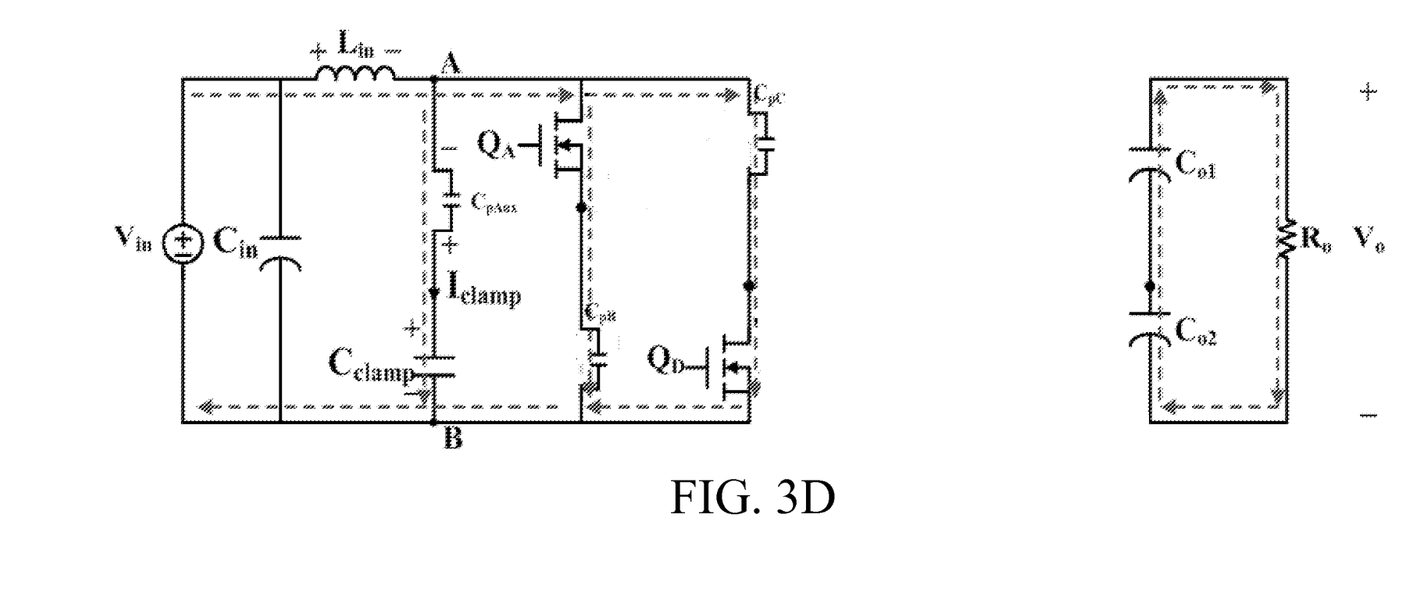

At the fourth status as the time being $t_3\sim t_4$, the energy transmission path is shown is FIG. 3D. The first switch $Q_A$ and the fourth switch $Q_D$ are turned on and the first output diode $D_{o1}$ and the second output diode $D_{o2}$ are turned off at $t_3$. The second switch $Q_B$ and the third switch $Q_C$ are turned off (status changed) at this time. The first output capacitor $C_{o1}$ and the second output capacitor $C_{o2}$ provide energy to the load $R_o$. At this status, the parasitic capacitors $C_{pC}$ and $C_{pB}$ of the third switch $Q_C$ and the second switch $Q_B$ are charged and the parasitic capacitor $C_{pAux}$ of the auxiliary switch $Q_{Aux}$ is discharged for charging the clamping capacitor $C_{clamp}$. At $t_4$, the parasitic capacitors $C_{pC}$ and $C_{pB}$ are charged to $V_{Cclamp}$ and the parasitic capacitor $C_{pAux}$ of the auxiliary switch $Q_{Aux}$ is discharged to zero. Thus, the auxiliary switch $Q_{Aux}$ is turned on for achieving zero voltage switching. After the parasitic capacitors $C_{pC}$ and $C_{pB}$ charged to $V_{Cclamp}$ current $I_{clamp}$ of the clamping capacitor $C_{clamp}$ flowing through the input inductor $L_{in}$, and the status is terminated. LC resonating phenomenon is occurred at this status.

The following equations present the status description.

$$\omega_0 = 1/\sqrt{L_{in}C_r},\ Z_0 = \sqrt{L_{in}/C_r},\ C_r = C_{pAux} + C_{pC} + C_{pB}\circ$$

$$v_{AB}(t) = V_{Cclamp}(t_3) - v_{C_{pAux}}(t) \quad (11)$$

$$v_{C_{pAux}}(t) = V_{Cclamp}(t_3) - \frac{i_{clamp}(t)}{C_{pAux}} \quad (12)$$

$$L_{in}\frac{di_{L_{in}}(t)}{dt} = V_{L_{in}} - v_{AB}(t) \quad (13)$$

$$i_{clamp}(t) = i_{L_{in}}(t) - i_{L_r}(t) \quad (14)$$

$$i_{L_{in}}(t) = \frac{V_{in}}{Z_0}\sin\omega_0(t - t_3) + i_{L_{in}}(t_3)\cos\omega_0(t - t_3) \quad (15)$$

$$i_{clamp}(t) = \frac{1}{3}i_{L_{in}}(t) \quad (16)$$

Figure 3E:
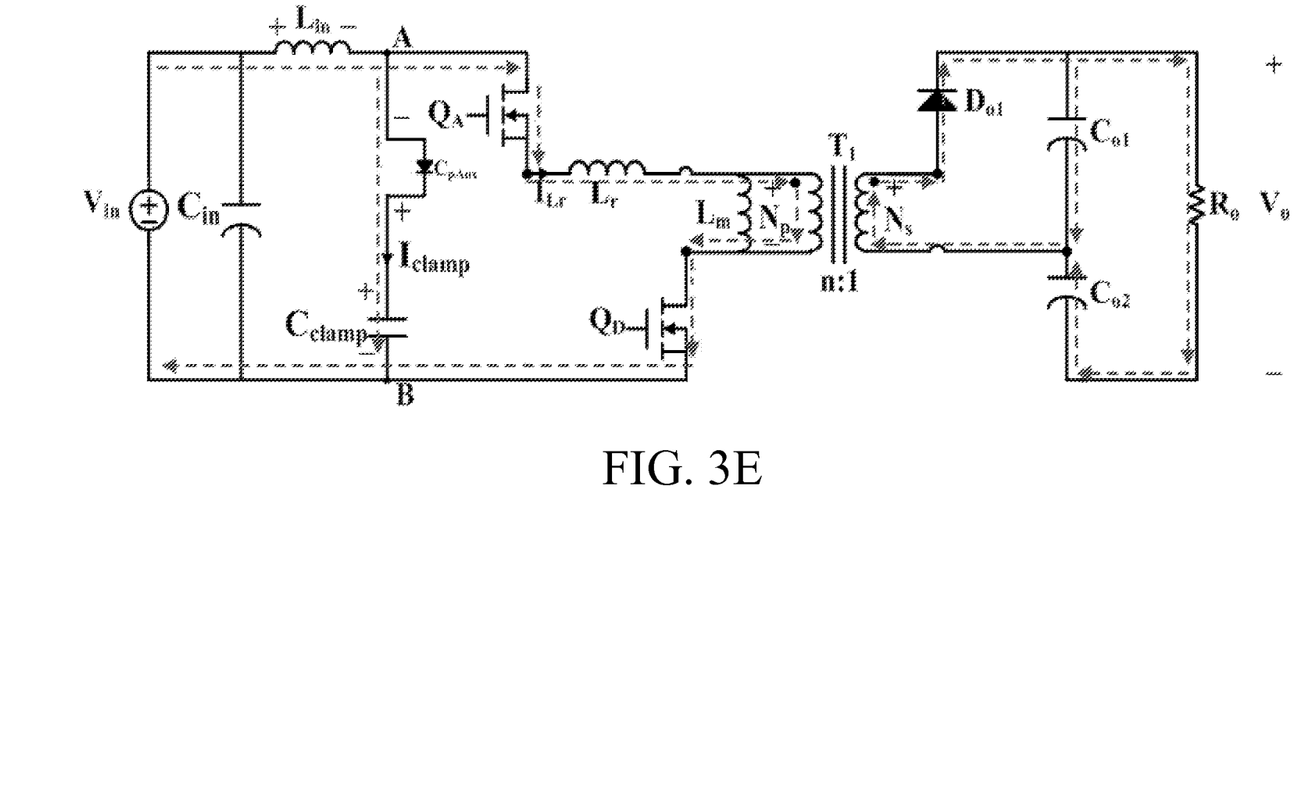

At the fifth status as the time being $t_4$~$t_5$, the energy transmission path is shown is FIG. 3E. The first switch $Q_A$ and the fourth switch $Q_D$ are turned on and the first output diode $D_{o1}$ is turned on at $t_4$. The second switch $Q_B$ and the third switch $Q_C$ are turned off at this time. The input voltage $V_{in}$ is transmitted to the secondary winding of the transforming unit T1 for supplying energy to the load $R_o$. The parasitic capacitor $C_{pAux}$ of the auxiliary switch $Q_A$ is discharged to zero at previous status so that current is still flowing through the parasitic diode of the auxiliary switch $Q_{Aux}$. After the auxiliary switch $Q_{Aux}$ turned on, the status is terminated. LC resonating phenomenon is also occurred at this status until $t_7$.

The following equations present the status description.

$$\omega_1 = 1/\sqrt{L_rC_{clamp}},\ Z_1 = \sqrt{L_r/C_{clamp}} \quad (17)$$

$$v_{AB}(t) = (i_{L_{in}}(t_4) - i_{L_r}(t_4))Z_1\sin\omega_1(t - t_4) +$$
$$\left(V_{Cclamp}(t_4) - \frac{nV_o}{2}\right)\cos\omega_1(t - t_4) + \frac{nV_o}{2}$$

$$i_{L_r}(t) = -(i_{L_{in}}(t_4) - i_{L_r}(t_4))\cos\omega_1(t - t_4) + \quad (18)$$
$$\left(\frac{V_{Cclamp}(t_4) - \frac{nV_o}{2}}{Z_1}\right)\sin\omega_1(t - t_4) + i_{L_{in}}(t_4) + i_{L_r}(t_4)$$

$$i_{clamp}(t) = \quad (19)$$
$$(i_{L_{in}}(t_4) - i_{L_r}(t_4))\cos\omega_1(t - t_4) + \left(\frac{\frac{nV_o}{2} - V_{Cclamp}(t_4)}{Z_1}\right)\sin\omega_1(t - t_4)$$

Figure 3F:
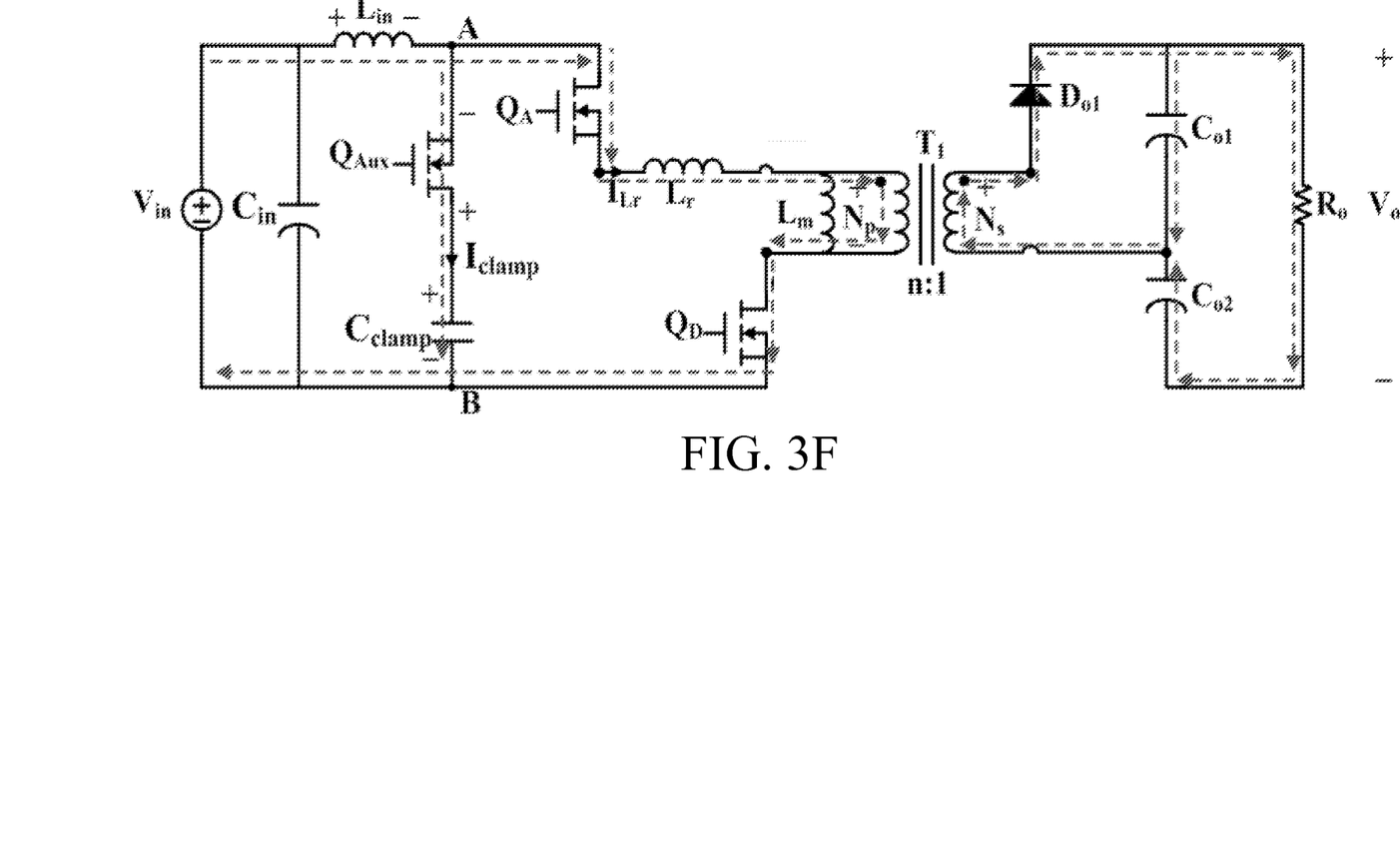

At the sixth status as the time being $t_5$~$t_6$, the energy transmission path is shown is FIG. 3F. The first switch $Q_A$ and the fourth switch $Q_D$ are turned on and the first output diode $D_{o1}$ is turned on at $t_5$. The second switch $Q_B$ and the third switch $Q_C$ are turned off at this time. The input voltage $V_{in}$ is transmitted to the secondary winding of the transforming unit T1 for supplying energy to the load $R_o$. The parasitic capacitor $C_{pAux}$ of the auxiliary switch $Q_{Aux}$ is discharged to zero at previous status so that the auxiliary switch $Q_{Aux}$ is turned on (after a predetermined time period ($t_5$-$t_3$) that the operation statues of the second switch $Q_B$ and the third switch $Q_C$ are changed) for achieving zero voltage switching. The clamping capacitor $C_{clamp}$ is still charged until the current $I_{Cclamp}$ of the clamping capacitor $C_{clamp}$ reducing to zero. Equations (13), (14), (17), (18) and (19) are used for presenting the status description.

Figure 3G:
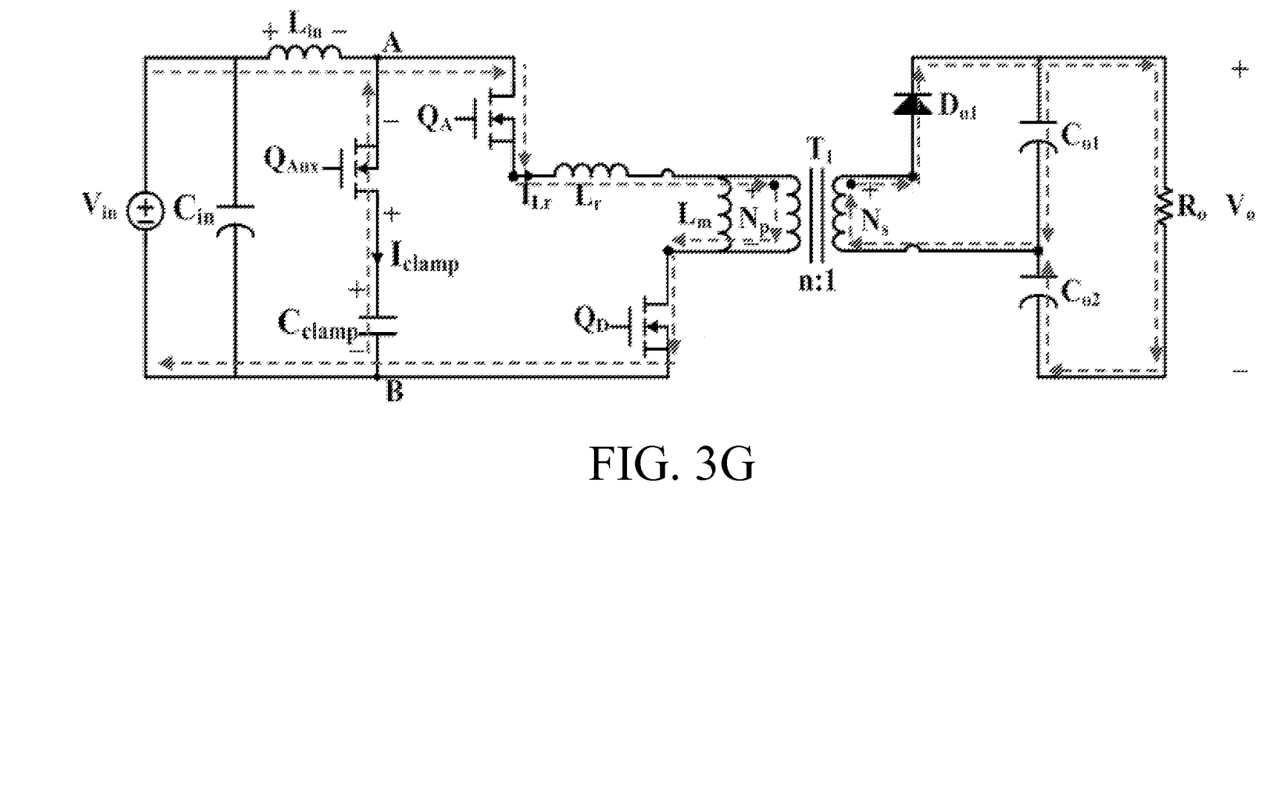

At the seventh status as the time being $t_6$~$t_7$, the energy transmission path is shown is FIG. 3G. The first switch $Q_A$ and the fourth switch $Q_D$ are turned on and the first output diode $D_{o1}$ is turned on at $t_6$. The second switch $Q_B$ and the third switch $Q_C$ are turned off at this time. The input voltage $V_{in}$ is transmitted to the secondary winding of the transforming unit T1 for supplying energy to the load $R_o$. The clamping capacitor $C_{clamp}$ feed energy back to the primary winding of the transforming unit T1 due to the current $I_{clamp}$ of the clamping capacitor $C_{clamp}$ reducing to zero and the auxiliary switch $Q_{Aux}$ not turned off yet. The current $I_{clamp}$ of the clamping capacitor $C_{clamp}$ is a reverse current. After the auxiliary switch $Q_{Aux}$ turned off, the status is terminated. Equations (13), (14), (17), (18) and (19) are used for presenting the status description.

Figure 3H:
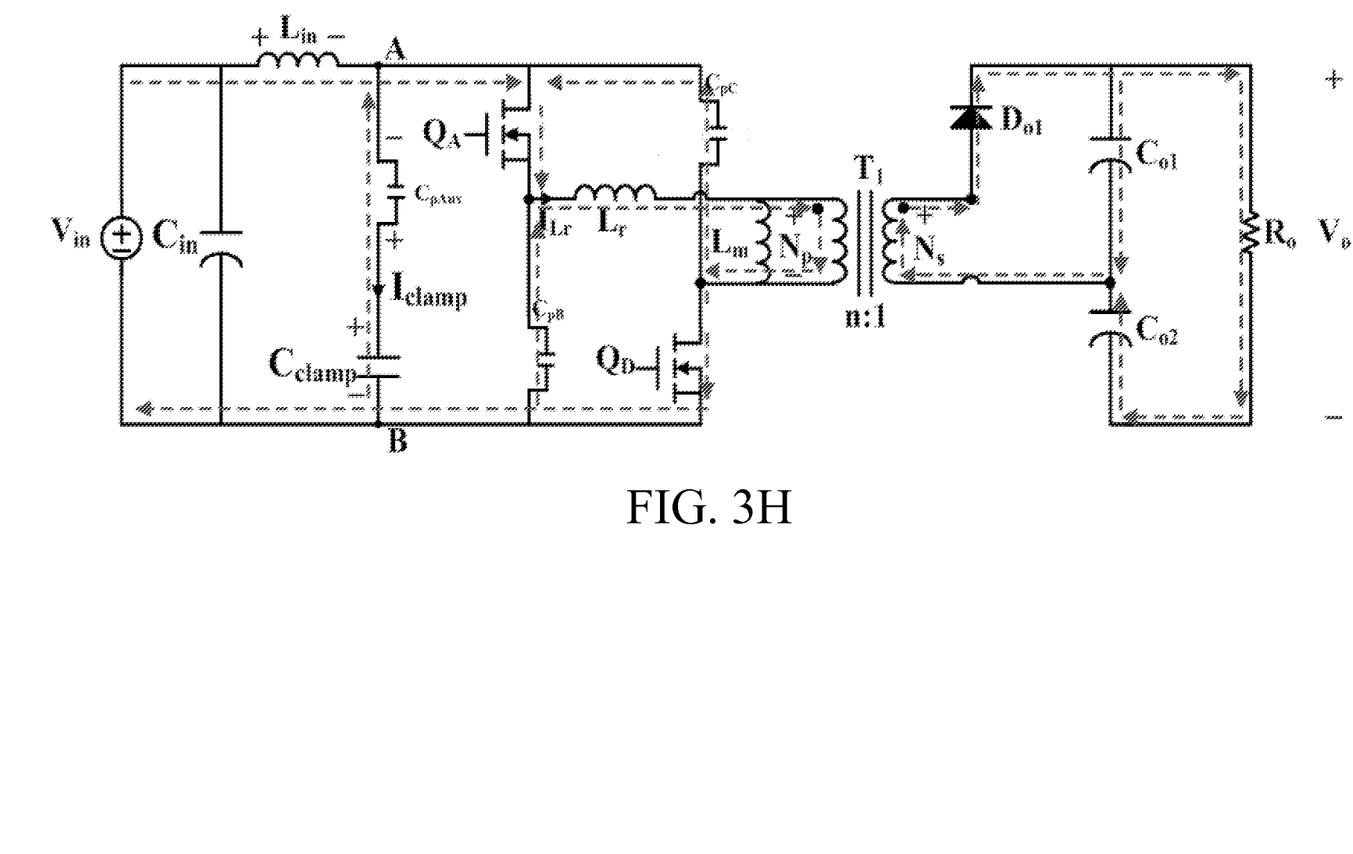

At the eighth status as the time being $t_7$~$t_8$, the energy transmission path is shown is FIG. 3H. The first switch $Q_A$ and the fourth switch $Q_D$ are turned on and the first output diode $D_{o1}$ is turned on at $t_6$. The second switch $Q_B$ and the third switch $Q_C$ are turned off at this time. The input voltage $V_{in}$, is transmitted to the secondary winding of the transforming unit T1 for supplying energy to the load $R_o$. The parasitic capacitors $C_{pC}$ and $C_{pB}$ of the third switch $Q_C$ and the second switch $Q_B$ are enforced to discharge to zero due to the auxiliary switch $Q_{Aux}$ turned off and the inductor current being continuously. LC resonating phenomenon is also occurred at this status and the parasitic capacitor $C_{pAux}$ of the auxiliary switch $Q_{Aux}$ is charged to $V_{Cclamp}$. After the parasitic capacitors $C_{pC}$ and $C_{pB}$ of the third switch $Q_C$ and the second switch $Q_B$ are discharged to zero, the status is terminated.

The following equations present the status description.

$$\omega_2 = 1/\sqrt{L_rC_r},\ Z_2 = \sqrt{L_r/C_r},\ C_r = C_{pAux} + C_{pC} + C_{pB}\circ \quad (20)$$

$$v_{AB}(t) = (i_{L_{in}}(t_7) - i_{L_r}(t_7))Z_2\sin\omega_2(t - t_7) +$$
$$\left(V_{Cclamp}(t_7) - \frac{nV_o}{2}\right)\cos\omega_2(t - t_7) + \frac{nV_o}{2}$$

$$i_{L_r}(t) = -(i_{L_{in}}(t_7) - i_{L_r}(t_7))\cos\omega_2(t - t_7) + \quad (21)$$
$$\left(\frac{V_{Cclamp}(t_7) - \frac{nV_o}{2}}{Z_2}\right)\sin\omega_2(t - t_7) + i_{L_{in}}(t_7) + i_{L_r}(t_7)$$

$$i_{clamp}(t) = \quad (22)$$
$$(i_{L_{in}}(t_7) - i_{L_r}(t_7))\cos\omega_2(t - t_7) + \left(\frac{\frac{nV_o}{2} - V_{Cclamp}(t_7)}{Z_2}\right)\sin\omega_2(t - t_7)$$

After $t_8$, it means that the first switch $Q_A$ and the fourth switch $Q_D$ are turned off and the second switch $Q_B$ and the third switch $Q_C$ are turned on. The operation is similar to the operation of the first switch $Q_A$ and the fourth switch $Q_D$ being turned on and the second switch $Q_B$ and the third switch $Q_C$ being turned off aforementioned.

The present invention adds an active clamping circuit in traditional current feeding full-bridge converter for clamping surge voltages on the four switches. The four switches achieves zero voltage conducting while switching, so that the circuit stability and power switch selectivity are improved.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A DC to DC converting circuit, comprising:
   a transforming unit with a primary winding and a secondary winding;
   a bridge converter unit coupled to an input voltage, having
      a first output terminal and a second output terminal coupled to both side of the primary winding respectively;
      a first switch coupled between the input voltage and the first output terminal;
      a second switch coupled between the first output terminal and a ground terminal;
      a third switch coupled between the input voltage and the second output terminal; and
      a fourth switch coupled between the second output terminal and the ground terminal;
   an output unit paralleled to the secondary winding; and
   a clamping unit coupled to the input voltage and paralleled to the bridge converter unit, having
      an auxiliary switch coupled to the input voltage; and
      a clamping capacitor coupled between the auxiliary switch and the ground terminal;
   wherein the auxiliary switch is turned on when operation statuses of the first switch and the fourth switch or the second switch and the third switch are changed;
   wherein the clamping unit is configured for achieving zero voltage switching (ZVS) of the switches of the bridge converter unit and the clamping unit.

2. The DC to DC converting circuit according to claim 1, wherein the auxiliary switch is turned on after a predetermined time period that the operation statuses of second switch and the third switch are changed.

3. The DC to DC converting circuit according to claim 1, wherein the output unit comprises a first output diode, a second output diode, a first output capacitor and a second output capacitor; wherein the forward input end of the first output diode is coupled to the first terminal of the secondary winding of the transforming unit and the forward output end of the first output diode is coupled to a load; wherein the forward input end of the second output diode is coupled to the ground terminal and the forward output end of the second output diode is coupled to the first terminal of the secondary winding of the transforming unit; wherein the first output capacitor is coupled between the second terminal of the secondary winding of the transforming unit and the load; wherein the second output capacitor is coupled between the second terminal of the secondary winding of the transforming unit and the ground terminal.

4. The DC to DC converting circuit according to claim 1, further comprising an input unit coupled between the clamping unit and the input voltage, the input unit having an input inductor and an input capacitor; wherein the input inductor is coupled between the clamping unit and the ground terminal and the input capacitor is paralleled to the input voltage.

* * * * *